United States Patent [19]

Freed

[11] Patent Number: 5,355,835
[45] Date of Patent: Oct. 18, 1994

[54] MARAUDER-DETERRENT BIRD FEEDER POLE AND PLATFORM SLIDE ASSEMBLY

[76] Inventor: Alvin N. Freed, 319 Cedar Pl., E. Rochester, N.Y. 14445

[21] Appl. No.: 164,366

[22] Filed: Dec. 9, 1993

[51] Int. Cl.$^5$ .................. A01K 39/00; A01K 29/00
[52] U.S. Cl. .................. 119/57.9; 248/123.1; 248/162.1; 119/52.3
[58] Field of Search .......... 119/52.2, 52.3, 57.8, 119/57.9, 59, 23, 21, 52.4, 59; 248/123.1, 125, 162.1

[56] References Cited

U.S. PATENT DOCUMENTS

| | | | |
|---|---|---|---|
| 1,273,308 | 7/1918 | Zsabka | 248/123.1 |
| 2,151,877 | 3/1939 | Walker | 248/123.1 |
| 2,891,508 | 6/1959 | Bower | 119/51 |
| 3,145,690 | 8/1964 | Bachman | 119/52.3 |
| 3,301,217 | 10/1967 | Prowinsky | 119/51 |
| 3,367,632 | 2/1968 | Vail | 119/23 |
| 3,986,480 | 10/1976 | Vail | 119/23 |
| 4,031,856 | 6/1977 | Chester | 119/51 R |
| 4,158,490 | 6/1979 | Gottschalk et al. | 248/123.1 X |
| 5,086,730 | 2/1992 | Figley | 119/52.3 |

*Primary Examiner*—Gene Mancene
*Assistant Examiner*—Thomas Price
*Attorney, Agent, or Firm*—John R. Flanagan

[57] ABSTRACT

A marauder-deterrent bird feeder pole and platform slide assembly includes a hollow upright pole adapted at a top end to support a bird feeder, a platform subassembly mounted about the pole for undergoing reciprocal movement between bottom and top ends of the pole, lower and upper pluralities of guide rollers respectively mounted to the lower and upper ends of the platform subassembly to undergo rotational movement relative thereto and rollably engaging the pole below and above the lower and upper ends of the platform subassembly so as to movably support the platform subassembly on the pole, and a biasing subassembly connected to the pole and to the platform subassembly for biasing the platform subassembly to move upward toward a raised home position adjacent to and spaced below the top end of the pole in absence of the weight of a marauding animal being imposed on the platform subassembly. The biasing subassembly is also yieldable to allow the platform subassembly to yield away from the raised home position and move downward toward a lowered displaced position remote from and spaced below the top end of the pole in response to the weight of the marauding animal being imposed thereon.

19 Claims, 2 Drawing Sheets

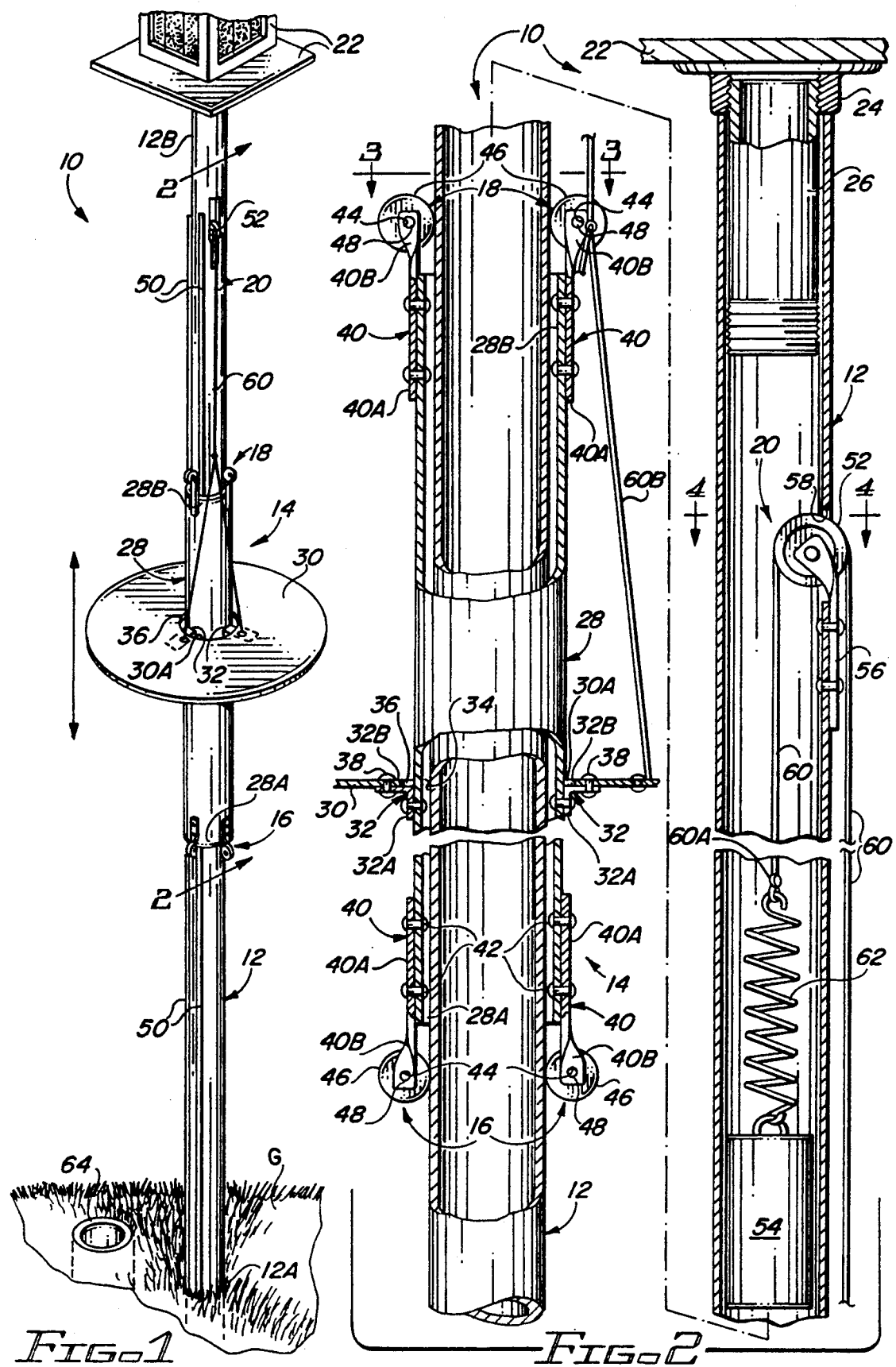

MARAUDER-DETERRENT BIRD FEEDER POLE AND PLATFORM SLIDE ASSEMBLY

BACKGROUND OF THE INVENTION

1. Field of the Invention

The present invention generally relates to devices for blocking marauding animals, such as squirrels and cats, from reaching a pole-mounted bird feeder and, more particularly, is concerned with a marauder-deterrent bird feeder pole and platform slide assembly.

2. Description of the Prior Art

Many bird feeders are mounted a considerable distance above ground level at top ends of long upright posts or poles having their lower ends buried in the ground. These pole-mounted bird feeders are often invaded by marauding animals, typically squirrels and cats, who are able to climb up the long pole to the bird feeder located at the top and steal the food.

Devices have been proposed over the years in the prior patent art to resolve this problem by preventing the marauder from climbing completely to the top of the pole and thus reaching the bird feeder. Representative examples of such prior art devices are the ones disclosed in U.S. patents to Bower (U.S. Pat. No. 2,891,508) and Chester (U.S. Pat. No. 4,031,856).

The Bower patent proposes a marauder-blocking guard in the form of an annular plate mounted about the pole at a spacing slightly below the bird feeder. The annular plate is supported on the pole by a conical spring and has a central aperture substantially larger in diameter than the pole to permit the plate to tilt or deflect by the weight of the marauding animal while attempting to climb the pole and pass the plate. The marauding animal, such as a squirrel, hopefully will be unable to climb around the tiltable plate and instead will become frightened and jump off and return to the ground.

The Chester patent proposes a squirrel-proof axially elongated sleeve mounted on the pole below the bird feeder for vertical slidable movement along the pole. A counterweight inside of the pole has sufficient mass to lift the sleeve to and hold the sleeve at an upper home position. However, when a marauding animal, such as a squirrel, climbs up the pole and onto the sleeve, the mass of the counterweight is insufficient to support the combined weight of the marauder and sleeve. The sleeve carrying the marauder will start to slide down the pole and hopefully the marauder will become frightened and jump off and return to the ground.

However, some marauding animals, especially squirrels, are particularly tenacious, persistent and resourceful and will try again and again to discover the weaknesses of such devices and learn how to bypass and defeat them. With respect to the Bower device, the squirrel will soon probably realize that the tiltable annular plate is nothing to fear and so after awhile will not be startled and scared away by its tilting action. Instead, the squirrel may learn that it might serve as a springboard to the bird feeder. With respect to the Chester device, the squirrel will soon probably learn how to sprint up the pole at a sufficient speed to carry it past the slidable sleeve without having to grab onto the slidable sleeve and so defeat the impediment posed by the sleeve.

Consequently, a need still exists for a device which will overcome the drawbacks of the prior art devices and more effectively block access of marauding animals to pole-mounted bird feeders.

SUMMARY OF THE INVENTION

The present invention provides a marauder-deterrent bird feeder pole and platform slide assembly designed to satisfy the aforementioned need. Field testing has demonstrated that the pole and platform slide assembly of the present invention provides a unique combination of obstructions which cannot be defeated by the agility and tenacity of the most resourceful and persistent of marauding animals, the squirrel. It has been found that squirrels, after many practice attempts, are unable to sprint up the pole past the platform slide to the bird feeder at the top of the pole and also, even if successful in climbing onto the platform slide, are unable to then successfully climb the remaining portion of the pole above the platform slide from a stationary start thereon.

Accordingly, the present invention is directed to a marauder-deterrent bird feeder pole and platform slide assembly which comprises: (a) an elongated hollow pole having a pair of opposite bottom and top ends, the pole adapted at the bottom end to be mounted to and extend upright from the ground and adapted at the top end to support a bird feeder; (b) a platform subassembly having lower and upper ends and being mounted about the pole for undergoing reciprocal movement between the bottom and top ends of the pole; (c) lower and upper pluralities of guide rollers respectively mounted to the lower and upper ends of the platform subassembly and rollably engaging the pole below and above the platform subassembly so as to movably support the platform subassembly on the pole; and (d) means mounted to the pole and connected to the platform subassembly for biasing the platform subassembly to move upward toward a raised home position adjacent to and spaced below the top end of the pole in absence of the weight of a marauding animal being imposed on the platform subassembly, the biasing means being yieldable away from the raised home position to permit the platform subassembly to move downward toward a lowered displaced position remote from and spaced below the top end of the pole in response to the weight of the marauding animal being imposed on the platform subassembly.

More particularly, the platform subassembly includes an elongated hollow sleeve defining the lower and upper ends of the platform subassembly, the sleeve being received over the pole and extending coaxially therewith to undergo slidable movement therealong, an annular platform having a central opening defined therethrough receiving the sleeve and pole therethrough, and means for fixedly attaching the annular platform to the sleeve intermediately between the lower and upper ends thereof such that the platform surrounds and extends radially outwardly from and in transverse relation to the sleeve and pole. The rollers of the lower and upper pluralities thereof are mounted respectively to the lower and upper ends of the sleeve to undergo rotational movement relative to the sleeve and rollably engage the pole below and above the lower and upper ends of the sleeve.

The pole and platform assembly further comprises means mounted on the pole for guiding the platform subassembly to undergo substantially linear movement along the pole so as to thereby prevent the platform subassembly from also undergoing rotational movement about the pole. The guiding means includes a pair of rails mounted longitudinally along a side of the pole and extending between the lower and upper ends thereof for confining at least one of the guide rollers and thereby the platform assembly to undergoing linear movement along the pole between the rails.

The biasing means includes a pulley rotatably mounted adjacent to the top end of the pole and a counterweight disposed in the pole. The biasing means also includes an elongated flexible cord having a pair of opposite ends and being entrained over the rotatable pulley. The flexible cord extends downwardly from the pulley inside of the pole to where one end of the flexible cord is attached to the counterweight and extending downwardly from the pulley outside of the pole to where the other of the opposite ends of the flexible cord is attached to the platform subassembly.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 1 is a perspective view of a marauder-deterrent bird feeder pole and platform slide assembly of the present invention.

FIG. 2 is an enlarged fragmentary foreshortened longitudinal view, with parts broken away and sectioned, of the pole and platform slide assembly taken along line 2—2 of FIG. 1.

DETAILED DESCRIPTION OF THE INVENTION

Figure 6:
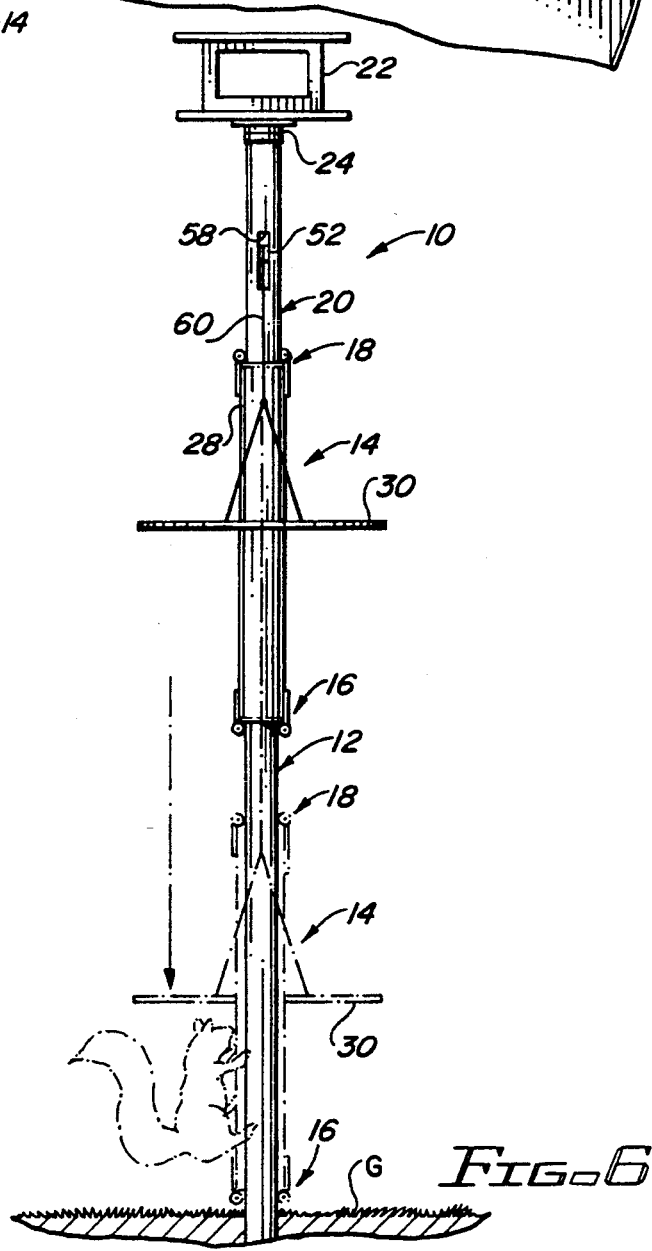
FIG. 6 is a front elevational view of the assembly of FIG. 1 showing the pole and platform slide assembly actuated by a squirrel to descend from an upper home position to a lower displaced position.

Referring to the drawings, and particularly to FIGS. 1, 2 and 6, there is illustrated a marauder deterrent bird feeder pole and platform slide assembly, generally designated 10, being constructed in accordance with the principles of the present invention. The pole and platform slide assembly 10 basically includes an elongated hollow pole 12, a platform assembly 14, pluralities of lower and upper guide roller subassemblies 16, 18, and a biasing subassembly 20.

The elongated pole 12 of the assembly 10 is of cylindrical configuration and has a pair of opposite bottom and top ends 12A, 12B. The pole 12 is adapted at its bottom end 12A to be buried a short distance into the ground G for mounting the pole 12 in an upright position extending upwardly from the ground G. The pole 12 is adapted at its top end 12B to support a bird feeder 22. More particularly, the assembly 10 also includes a mounting bracket 24 adapted to attachably support the bird feeder 22 and a tubular coupler 26 attached to an underside of the mounting bracket 24 and to threadably and snugly fit within the top end 12B of the pole 12.

Figure 3:
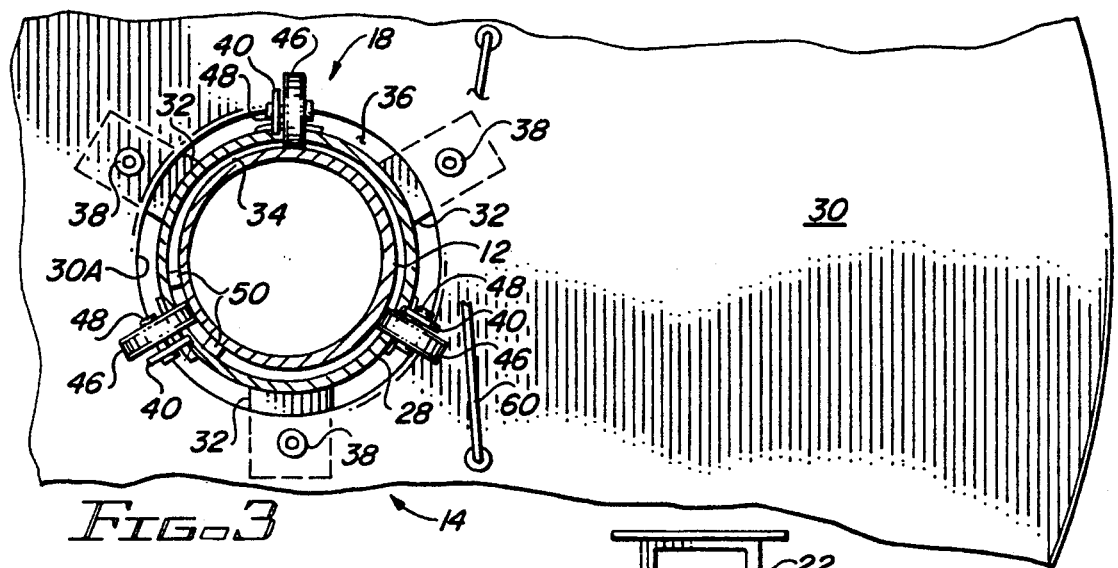
FIG. 3 is an enlarged fragmentary cross-sectional view of the pole and platform slide assembly taken along line 3—3 of FIG. 2.
Figure 4:
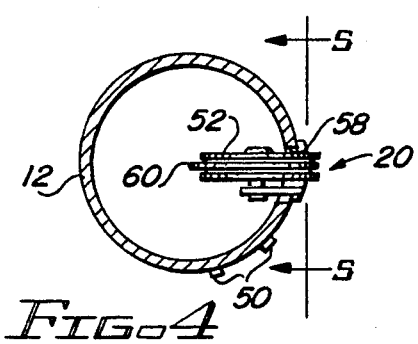
FIG. 4 is an enlarged cross-sectional view of the pole and platform slide assembly taken along line 4—4 of FIG. 2.
Figure 5:
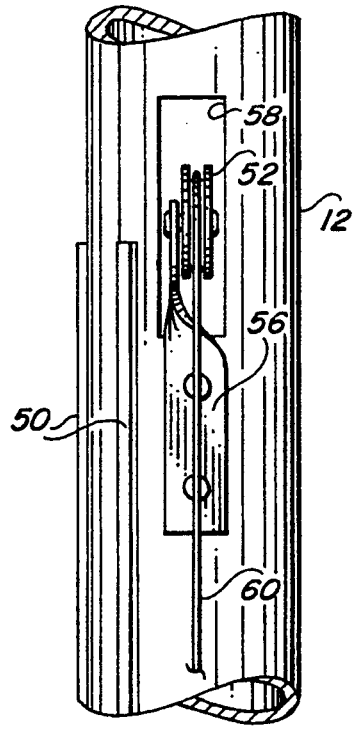
FIG. 5 is a fragmentary front elevational view of the pole and platform slide assembly as seen along line 5—5 of FIG. 4.

Referring to FIGS. 1–3, the platform subassembly 14 of the assembly 10 is mounted about the elongated pole 12 for undergoing reciprocal movement between the bottom and top ends 12A, 12B thereof. The platform subassembly 14 includes an elongated hollow sleeve 28, an annular platform 30 and means 32 fixedly attaching the annular platform 30 about the sleeve 28.

More particularly, the elongated hollow sleeve 28 of the platform subassembly 14 has a cylindrical configuration and defines lower and upper ends 28A, 28B of the platform subassembly 14. The sleeve 28 is slidably received over the pole 12 and extends coaxially with the pole 12 and is adapted to undergo slidable movement along the pole 12. The annular platform 30 has a central opening 30A defined therethrough which receives the sleeve 28 and pole 12 therethrough. As seen in FIG. 3, the inside diameter of the sleeve 28 is sufficiently larger than the outside diameter of the pole 12 so as to provide an annular space 34 therebetween. Similarly, the inside diameter of the central opening 30A in the annular platform 30 is sufficiently larger than the outside diameter of the sleeve 28 so as to provide an annular space 36 therebetween.

Referring to FIGS. 2 and 3, the attaching means 34 of the platform subassembly 14 includes a plurality of brackets 32. The brackets 32 are circumferentially spaced from one another about the sleeve 28 and annular platform 30. Each bracket 32 has a pair of leg portions 32A, 32B rigidly attached at a substantially right angle to one another and respectively fastened by fasteners 38 to the sleeve 28 and platform 30. In such manner, the brackets 32 fixedly attach the annular platform 30 to the sleeve 28 intermediately between the lower and upper ends 28A, 28B thereof such that the platform 30 surrounds and extends radially outwardly from and in transverse relation to the sleeve 28 and pole 12.

Referring to FIGS. 1–3 and 6, the lower and upper pluralities of guide roller subassemblies 16, 18 are respectively mounted to the lower and upper ends 28A, 28B of the sleeve 28. Each guide roller subassembly 16, 18 includes an elongated mounting bracket 40 attached at one end portion 40A by suitable fasteners 42 to the respective one of the lower and upper ends 28A, 28B of the sleeve 28 and twisted ninety degrees at the other end portion 40B relative to the one end portion 40A and having an aperture 44 defined therethrough. The twisted other end portion 40B of the mounting bracket 40 also extends beyond the respective one of the lower and upper ends 28A, 28B of the sleeve 28. Each guide roller subassembly 16, 18 also includes a wheel or roller 46 rotatably mounted to the other end portion 40B of the mounting bracket 40 by a mounting pin 48 extending through the roller 46 and aperture 44 of the mounting bracket 40. The lower and upper rollers 46 are so mounted to undergo rotational movement relative to the sleeve 28 and respectively rollably engage the pole 12 below and above the lower and upper ends 28A, 28B of the sleeve 28.

Referring to FIGS. 1–3 and 5, the pole and platform assembly 10 further comprises means mounted on the pole 12 for guiding the platform subassembly 14 to undergo substantially linear movement along the pole so as to thereby prevent the platform subassembly 14 from also undergoing rotational movement about the pole 12. The guiding means includes a pair of guide rails 50 mounted longitudinally along a side of the pole 12 and extending between the lower and upper ends 12A, 12B thereof for confining at least one and preferably an aligned pair of lower and upper guide rollers 46 and thereby the platform subassembly 14 to undergoing only linear movement longitudinally along the pole 12 between the guide rails 50.

The biasing subassembly 20 of the assembly 10 is mounted to the pole 12 and connected to the platform subassembly 14 for biasing the platform subassembly 14 to move upward toward a raised home position, as shown in solid line form in FIG. 6, adjacent to and spaced below the top end 12B of the pole 12 in absence of the weight of a marauding animal being imposed on the platform subassembly 14. The biasing subassembly 20 also is yieldable away from the raised home position to permit the platform subassembly 14 to move downward toward a lowered displaced position, as seen in dashed line form in FIG. 6, remote from and spaced below the top end 12B of the pole 12 in response to the weight of a marauding animal being imposed on the platform subassembly 14. The biasing subassembly 20 includes a guide element in the form of a pulley 52 rotatably mounted adjacent to the top end 12B of the pole 12 and a counterweight 54 disposed in the pole 12. The guide pulley 52 is rotatably mounted by another mounting bracket 56 to the pole 12 and disposed through an opening 58 defined in a side of the pole 12. The biasing subassembly 20 also includes an elongated flexible inelastic cord 60 having a pair of opposite ends 60A, 60B. The flexible cord 60 is entrained over the rotatable guide pulley 52. The flexible cord 60 extends downwardly from the pulley 52 along the inside of the pole 12 to where one of its ends 60A is interconnected to the counterweight 54 by an extendible and compressible shock-absorbing coil spring 62. The flexible cord 60 also extends downwardly from the pulley 52 along the outside of the pole 12 to where the other of the its ends 60B is attached to the annular platform 30 of the platform subassembly 14.

Also, as seen in FIG. 1, a short section of tubing, referred to as a pole stand 64, is installed in the ground near the pole 12. The pole 12 is preferably provided in upper and lower sections which interfit with one so that the upper section can be removed from the lower section and temporary installed in the pole stand 64 when it is desired to restock the bird feeder 22.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A marauder-deterrent bird feeder pole and platform slide assembly, comprising:
   (a) an elongated hollow pole having a pair of opposite bottom and top ends, said pole adapted at said bottom end to be mounted to and extend upright from the group and adapted at said top end to support a bird feeder;
   (b) a platform subassembly having lower and upper ends and being mounted about said pole for undergoing reciprocal movement between said bottom and top ends of said pole;
   (c) first and second pluralities of guide rollers respectively mounted to said lower and upper ends of said platform subassembly and rollably engaging said pole below and above said platform subassembly so as to movably support said platform subassembly on said pole;
   (d) means mounted to said pole and connected to said platform subassembly for biasing said platform subassembly to move upward toward a raised home position adjacent to and spaced below said top end of said pole in absence of the weight of a marauding animal being imposed on said platform subassembly, said biasing means being yieldable away from the raised home position to permit said platform subassembly to move downward toward a lowered displaced position remote from and spaced below said top end of said pole in response to the weight of the marauding animal being imposed on said platform subassembly; and
   (e) means attached longitudinally along a side of said pole and extending between said top and bottom ends thereof for guiding said platform subassembly to undergo substantially linear movement along said pole so as to thereby prevent said platform subassembly from also undergoing rotational movement about said pole.

2. A marauder-deterrent bird feeder pole and platform slide assembly, comprising:
   (a) an elongated hollow pole having a pair of opposite bottom and top ends, said pole adapted at said bottom end to be mounted to and extend upright from the ground and adapted at said top end to support a bird feeder;
   (b) a platform subassembly having lower and upper ends and being mounted about said pole for undergoing reciprocal movement between said bottom and top ends of said pole;
   (c) first and second pluralities of guide rollers respectively mounted to said lower and upper ends of said platform subassembly and rollably engaging said pole below and above said platform subassembly so as to movably support said platform subassembly on said pole;
   (d) means mounted to said pole and connected to said platform subassembly for biasing said platform subassembly to move upward toward a raised home position adjacent to and spaced below said top end of said pole in absence of the weight of a marauding animal being imposed on said platform subassembly, said biasing means being yieldable away from the raised home position to permit said platform subassembly to move downward toward a lowered displaced position remote from and spaced below said top end of said pole in response to the weight of the marauding animal being imposed on said platform subassembly; and
   (e) means mounted on said pole for guiding said platform subassembly to undergo substantially linear movement along said pole so as to thereby prevent said platform subassembly from also undergoing rotational movement about said pole, said guiding means including a pair of rails attached longitudinally along a side of said pole and extending between said bottom and top ends thereof for confining at least one of said guide rollers and thereby said platform subassembly to linear movement along said pole between said rails.

3. The assembly of claim 2 wherein said biasing means includes:

a pulley rotational mounted adjacent to said top end of said pole and disposed through an opening defined in a side of said pole;

a counterweight disposed in said pole; and an elongated flexible member having a pair of opposite ends and being entrained over said rotatable pulley, said flexible member extending downwardly from said pulley inside of said pole to where one end of said flexible member is attached to said counterweight and extending downwardly from said pulley outside of said pole to where the other of said opposite ends of said flexible member is attached to said platform assembly.

4. The assembly of claim 3 wherein said biasing means also includes an extensible and compressible coil spring extending between and connected at opposite ends respectively to said counterweight and said one end of said flexible member.

5. The assembly of claim 2 further comprising:

a mounting bracket adapted to attachably support a bird feeder; and a tubular coupler attached to an underside of said mounting bracket and adapted to snugly fit within said top end of said pole.

6. A marauder-deterrent bird feeder pole and platform slide assembly, comprising:

(a) an elongated hollow pole having a pair of opposite bottom and top ends, said pole adapted at said bottom end to be mounted to and extend upright from the ground and adapted at said top end to support a bird feeder;

(b) a platform subassembly having lower and upper ends and being mounted about said pole for undergoing reciprocal movement between said bottom and top ends of said pole;

(c) first and second pluralities of guide rollers respectively mounted to said lower and upper ends of said platform subassembly and rollably engaging said pole below and above said platform subassembly so as to movably support said platform subassembly on said pole; and (d) means mounted to said pole and connected to said platform subassembly for biasing said platform subassembly to move upward toward a raised home position adjacent to and spaced below said top end of said pole in absence of the weight of a marauding animal being imposed on said platform subassembly, said biasing means being yieldable away from the raised home position to permit said platform subassembly to move downward toward a lowered displaced position remote from and spaced below said top and of said pole in response to the weight of the marauding animal being imposed on said platform subassembly;

(e) said platform subassembly including an elongated hollow sleeve defining said lower and upper ends of said platform subassembly, said sleeve being received over said pole and extending coaxially therewith to undergo slidable movement therealong.

7. The assembly of claim 6 wherein said platform subassembly further includes an annular platform having a central opening defined therethrough receiving said sleeve and pole therethrough and means for fixedly attaching said annular platform to said sleeve intermediately between said lower and upper ends thereof such that said platform surrounds and extends radially outwardly from and in transverse relation to said sleeve and pole.

8. The assembly of claim 7 wherein said attaching means includes a plurality of brackets being spaced circumferentially about said sleeve and annular platform, each bracket having a pair of leg portions attached at a substantially right angle to one another and respectively fastened to said sleeve and platform.

9. The assembly of claim 6 wherein said rollers of said first and second pluralities thereof are mounted respectively to said lower and upper ends of said sleeve to undergo rotational movement relative to said sleeve and rollably engage said pole below and above said lower and upper ends of said sleeve.

10. The assembly of claim 9 wherein said platform subassembly further includes an annular platform having a central opening defined therethrough receiving said sleeve and pole therethrough and means for fixedly attaching said annular platform to said sleeve intermediately between said lower and upper ends thereof such that said platform surrounds and extends radially outwardly from and in transverse relation to said sleeve and pole.

11. The assembly of claim 10 wherein said attaching means includes a plurality of brackets being spaced circumferentially about said sleeve and annular platform, each bracket having a pair of leg portions attached at a substantially right angle to one another and respectively fastened to said sleeve and platform.

12. The assembly of claim 9 further comprising:

means mounted on said pole for guiding said platform subassembly to undergo substantially linear movement along said pole so as to thereby prevent said platform subassembly from undergoing rotational movement about said pole.

13. The assembly of claim 12 wherein said guiding means includes a pair of rails mounted longitudinally along a side of said pole and extending through said sleeve and between said bottom and top ends of said pole for confining at least one of said guide rollers and thereby said platform assembly to linear movement along said pole between said rails.

14. A marauder-deterrent bird feeder pole and platform slide assembly, comprising:

(a) an elongated hollow pole having a pair of opposite bottom and top ends, said pole adapted at said bottom end to be mounted to and extend upright from the ground and adapted at said top end to support a bird feeder;

(b) a platform subassembly having lower and upper ends and being mounted about said pole for undergoing reciprocal movement between said bottom and top ends of said pole, said platform subassembly including (i) an elongated hollow sleeve defining said lower and upper ends of said platform subassembly, said sleeve being received over said pole and extending coaxially therewith to undergo slidable movement therealong, (ii) an annular platform having a central opening defined therethrough receiving said sleeve and pole therethrough, and (iii) means for fixedly attaching said annular platform to said sleeve intermediately between said lower and upper ends thereof such that said platform surrounds and extends radially outwardly from and in transverse relation to said sleeve and pole;

(c) first and second pluralities of guide rollers respectively mounted to said lower and upper ends of said sleeve of said platform subassembly to undergo rotational movement relative to said sleeve and rollably engaging said pole below and above said lower and upper ends of said sleeve so as to movably support said platform subassembly on said pole;

(d) means mounted on said pole for guiding said platform subassembly to undergo substantially linear movement along said pole so as to thereby prevent said platform subassembly from also undergoing rotational movement about said pole; and (e) means mounted to said pole and connected to said platform subassembly for biasing said platform subassembly to move upward toward a raised home position adjacent to and spaced below said top end of said pole in absence of the weight of a marauding animal being imposed on said platform subassembly, said biasing means being yieldable away from the raised home position to permit said platform subassembly to move downward toward a lowered displaced position remote from and spaced below said top end of said pole in response to the weight of the marauding animal being imposed on said platform subassembly, said biasing means including (i) a guide element mounted adjacent to said top end of said pole, (ii) a counterweight disposed in said pole, and (iii) an elongated flexible member having a pair of opposite ends and being entrained over said guide element, said flexible member extending downwardly from said guide element inside of said pole to where one end of said flexible member is attached to said counterweight and extending downwardly from said guide element outside of said pole to where the other of said opposite ends of said flexible member is attached to said annular platform of said platform subassembly.

15. The assembly of claim 14 wherein said guiding means includes a pair of rails mounted longitudinally along a side of said pole and extending through said sleeve and between said bottom and top ends of said pole for confining at least one of said guide rollers and thereby said platform subassembly to linear movement along said pole between said rails.

16. The assembly of claim 14 wherein said attaching means includes a plurality of brackets being spaced circumferentially about said sleeve and annular platform, each bracket having a pair of leg portions attached at a substantially right angle to one another and respectively fastened to said sleeve and platform.

17. The assembly of claim 14 wherein said biasing means also includes an extendible and compressible coil spring extending between and connected at opposite ends respectively to said counterweight and said one end of said flexible member.

18. The assembly of claim 14 further comprising:
a mounting bracket adapted to attachably support a bird feeder; and
a tubular coupler attached to an underside of said mounting bracket and adapted to snugly fit within said top end of said pole.

19. The assembly of claim 14 wherein said guide element is a pulley rotatably mounted adjacent to said top end of said pole and disposed through an opening defined in a side of said pole.

* * * * *